(12) United States Patent
Auer et al.

(10) Patent No.: US 8,087,539 B2
(45) Date of Patent: *Jan. 3, 2012

(54) EASILY REMOVABLE MULTI-PANELED LOCKING COVER

(75) Inventors: Robert Thomas Auer, East Stroudsburg, PA (US); Jason Wesley Stull, Morristown, NJ (US)

(73) Assignee: Stull Technologies, Inc., Somerset, NJ (US)

( * ) Notice: Subject to any disclaimer, the term of this patent is extended or adjusted under 35 U.S.C. 154(b) by 1183 days.

This patent is subject to a terminal disclaimer.

(21) Appl. No.: 11/890,915

(22) Filed: Aug. 7, 2007

(65) Prior Publication Data
US 2008/0078760 A1 Apr. 3, 2008

Related U.S. Application Data

(63) Continuation-in-part of application No. 11/654,322, filed on Jan. 17, 2007, now Pat. No. 7,594,588, and a continuation-in-part of application No. 11/542,547, filed on Oct. 3, 2006, now Pat. No. 7,594,587.

(51) Int. Cl.
*B65D 45/22* (2006.01)
*B65D 41/16* (2006.01)
*B65D 51/16* (2006.01)

(52) U.S. Cl. ............ 220/784; 220/326; 220/367.1; 220/781; 220/380; 215/216

(58) Field of Classification Search ......... 220/326, 220/367.1, 380, 781, 784; 215/216
See application file for complete search history.

(56) References Cited

U.S. PATENT DOCUMENTS

| | | | |
|---|---|---|---|
| 247,547 A | 9/1881 | Eisemann | |
| 471,911 A | 3/1892 | Sutro | |
| 1,482,931 A | 2/1924 | Keehn | |
| 2,205,685 A | 9/1936 | Conner | |
| 2,695,806 A | 2/1953 | Balint | |
| 3,083,861 A | 4/1963 | Amberg et al. | |
| 3,269,588 A * | 8/1966 | Ruekberg | 53/485 |
| 3,499,574 A | 3/1970 | Yates, Jr. | |
| 3,642,161 A | 2/1972 | Stroud | |
| 3,688,942 A | 9/1972 | Mitchell et al. | |
| 3,703,975 A | 11/1972 | Wittemer | |
| 3,868,041 A | 2/1975 | Knize | |

(Continued)

FOREIGN PATENT DOCUMENTS
WO WO 91/02685 3/1991

*Primary Examiner* — Anthony Stashick
*Assistant Examiner* — James N Smalley
(74) *Attorney, Agent, or Firm* — Drinker Biddle & Reath LLP

(57) ABSTRACT

A container cover for use with a container having a neck. The cover includes a lid, a skirt extending downward from the circumference of the lid, and a concentric plug seal extending from the lid inside the skirt. The cover also may include vent holes in the lid. The skirt preferably includes six lock panels. The sides of the lock panels are defined by vertical slots in the skirt, and each lock panel features at least one inwardly-projecting lock. When the cover is locked on the container, the locks engage a lip on the container neck. When a user wishes to remove the cover, the user pulls up on the edge of a lock panel, disengaging the locks from the container lip and removing the cover.

18 Claims, 8 Drawing Sheets

U.S. PATENT DOCUMENTS

| | | | |
|---|---|---|---|
| 3,885,712 A | 5/1975 | Libit | 222/153.14 |
| 3,964,634 A | 6/1976 | Jasinski et al. | |
| 4,014,452 A | 3/1977 | Galer | |
| 4,051,972 A * | 10/1977 | Botkin | 215/260 |
| 4,079,857 A | 3/1978 | Crisci | |
| 4,119,239 A | 10/1978 | Anderson | 220/324 |
| 4,209,107 A | 6/1980 | Crisci | |
| 4,210,258 A | 7/1980 | von Holdt | |
| 4,230,235 A | 10/1980 | Di Amico | |
| 4,244,920 A | 1/1981 | Manschot et al. | |
| 4,349,119 A | 9/1982 | Letica | |
| 4,387,828 A | 6/1983 | Yates, Jr. | |
| 4,390,110 A | 6/1983 | Pirro | |
| 4,480,762 A | 11/1984 | Thomas | |
| 4,526,289 A | 7/1985 | Schiemann | 220/304 |
| 4,530,440 A | 7/1985 | Leong | |
| 4,579,257 A | 4/1986 | Brandlein | 222/192 |
| 4,595,111 A | 6/1986 | Gould et al. | |
| 4,676,388 A | 6/1987 | Kuboshima | 215/217 |
| 4,687,112 A | 8/1987 | Swartzbaugh | |
| 4,718,571 A | 1/1988 | Bordner | |
| 4,752,013 A | 6/1988 | Miller et al. | |
| 4,752,014 A | 6/1988 | House et al. | 215/216 |
| 4,815,628 A | 3/1989 | Wehnert, III | |
| 4,936,494 A * | 6/1990 | Weidman | 222/480 |
| 4,949,865 A | 8/1990 | Turner | 220/713 |
| 5,042,683 A | 8/1991 | Shaw et al. | |
| 5,180,072 A | 1/1993 | Oehlert | |
| D334,324 S | 3/1993 | Pierce | |
| 5,232,116 A | 8/1993 | Baxter | |
| 5,275,287 A | 1/1994 | Thompson | |
| 5,292,017 A | 3/1994 | Reifers | |
| 5,310,981 A | 5/1994 | Sarnoff et al. | 219/731 |
| D353,444 S | 12/1994 | Merrett | |
| 5,375,730 A | 12/1994 | Bahr et al. | 220/324 |
| 5,377,860 A | 1/1995 | Littlejohn et al. | |
| 5,449,077 A | 9/1995 | Seidler | |
| 5,452,818 A | 9/1995 | Yost | |
| 5,518,133 A | 5/1996 | Hayes et al. | |
| 5,538,154 A * | 7/1996 | Von Holdt | 220/277 |
| 5,558,240 A | 9/1996 | Karp | |
| 5,603,421 A | 2/1997 | Opresco | |
| 5,695,086 A | 12/1997 | Viola | |
| 5,706,963 A | 1/1998 | Gargione | |
| 5,769,258 A | 6/1998 | Harrison et al. | 220/203.1 |
| 5,833,116 A | 11/1998 | Guillin | |
| 5,865,330 A | 2/1999 | Buono | |
| 5,881,907 A | 3/1999 | Schutz | |
| 5,894,953 A | 4/1999 | Ramirez | |
| 5,908,125 A | 6/1999 | Opresco | 215/216 |
| 5,915,581 A | 6/1999 | Pfirrmann et al. | |
| 5,921,417 A | 7/1999 | Mull | |
| 5,927,526 A | 7/1999 | Herr | |
| 5,960,979 A | 10/1999 | Van Den Brink et al. | |
| 6,036,036 A | 3/2000 | Bilani et al. | |
| 6,047,852 A | 4/2000 | Evans et al. | |
| 6,056,138 A | 5/2000 | Chen | |
| 6,112,921 A | 9/2000 | Robinson | |
| 6,202,869 B1 | 3/2001 | Sullivan | |
| 6,296,130 B1 | 10/2001 | Forsyth et al. | |
| 6,315,146 B1 | 11/2001 | Johnsen | |
| 6,357,615 B1 * | 3/2002 | Herr | 215/216 |
| 6,364,152 B1 | 4/2002 | Poslinski et al. | |
| 6,431,385 B1 | 8/2002 | Palmer | 220/324 |
| 6,439,409 B1 | 8/2002 | Dressel et al. | |
| 6,460,716 B1 | 10/2002 | Wong | |
| 6,575,323 B1 | 6/2003 | Martin et al. | |
| D478,282 S | 8/2003 | Hayes et al. | |
| 6,607,089 B2 | 8/2003 | Ferguson | |
| 6,612,450 B1 | 9/2003 | Buono | 215/228 |
| 6,644,494 B2 | 11/2003 | Hayes et al. | |
| 6,783,019 B2 | 8/2004 | Zettle et al. | |
| 6,910,599 B2 | 6/2005 | Tucker et al. | |
| 6,923,338 B2 | 8/2005 | Dees et al. | |
| 7,063,231 B2 | 6/2006 | Stanos et al. | |
| 7,823,746 B1 | 11/2010 | McCumber | |
| 2002/0148845 A1 | 10/2002 | Zettle et al. | |
| 2003/0085227 A1 | 5/2003 | Azzarello | |
| 2004/0195241 A1 | 10/2004 | Stull et al. | |
| 2005/0145627 A1 | 7/2005 | Stull et al. | |
| 2006/0255041 A1 | 11/2006 | Parks et al. | |
| 2006/0255052 A1 | 11/2006 | Svitak | |
| 2007/0012710 A1 | 1/2007 | Vovan | |
| 2008/0110911 A1 | 5/2008 | Chen | |

* cited by examiner

EASILY REMOVABLE MULTI-PANELED LOCKING COVER

RELATED APPLICATION

This application is continuation-in-part of U.S. patent application Ser. No. 11/654,322, filed on Jan. 17, 2007 and is a continuation in part of U.S. patent application Ser. No. 11/542,547, filed on Oct. 3, 2006, which are both incorporated herein by reference in their entirety.

FIELD OF THE INVENTION

The present invention relates generally to removable covers for containers, and more particularly, to removable and reusable covers for use with microwavable containers.

BACKGROUND OF THE INVENTION

It is known to provide a removable cover for a container, such as a container of food or drink. Many such containers can be placed in a microwave oven to heat their contents. The cover or closure functions to prevent the contents of the container from spilling when the container is moved, or splattering when being heated in the microwave. However, many prior art container covers have suffered from deficiencies. Depending on their construction, they may be difficult to put on or to remove, or may be too easily detached, thereby resulting in inadvertent removal of the cover. Many prior art container covers suffer from distortion when heated in the microwave. As a result, the attachment of the cover to the container is impaired or the quality of the seal between the cover and the container is reduced.

A need, therefore, exists for a cover that is easier to put onto and take off of a container, inhibits inadvertent removal, and that seals more dependably.

SUMMARY OF THE INVENTION

The invention is directed to a container cover for use with a container having a neck with an outer bead ring or lip. In exemplary embodiments, the container cover comprises a lid with a skirt extending downward from the circumference of the lid and a concentric plug seal extending downward from the bottom of the lid disposed inside the skirt. The skirt includes a plurality of flexible lock panels each having at least one inwardly projecting lock, which hold the cover in place on the container by engaging the container neck bead ring. An edge of each lock panel is defined by slots on either side that extend through the skirt and that allow the lock panel to flex to disengage the bead ring.

When the cover is installed on the container, the locks on the inside of the lock panels engage the outside of the container neck, and the plug seal preferably sealingly engages the inside of the container neck. In an embodiment, the lid is circular and fits on a container neck with a circular cross section. Also in a preferred embodiment, the skirt comprises six flexible lock panels disposed around the circumference of the cover, defined by six vertical slots.

Other objects, aspects and advantages of the present invention will become apparent to those skilled in the art upon reading the following detailed description, when considered in conjunction with the appended claims and the accompanying drawings briefly described below.

BRIEF DESCRIPTION OF THE DRAWINGS

For the purpose of illustrating the invention, there are shown in the drawings embodiments that are presently preferred; it being understood, however, that this invention is not limited to the precise arrangements and constructions particularly shown. In the drawings.

DETAILED DESCRIPTION OF THE PREFERRED EMBODIMENTS

Figure 1:
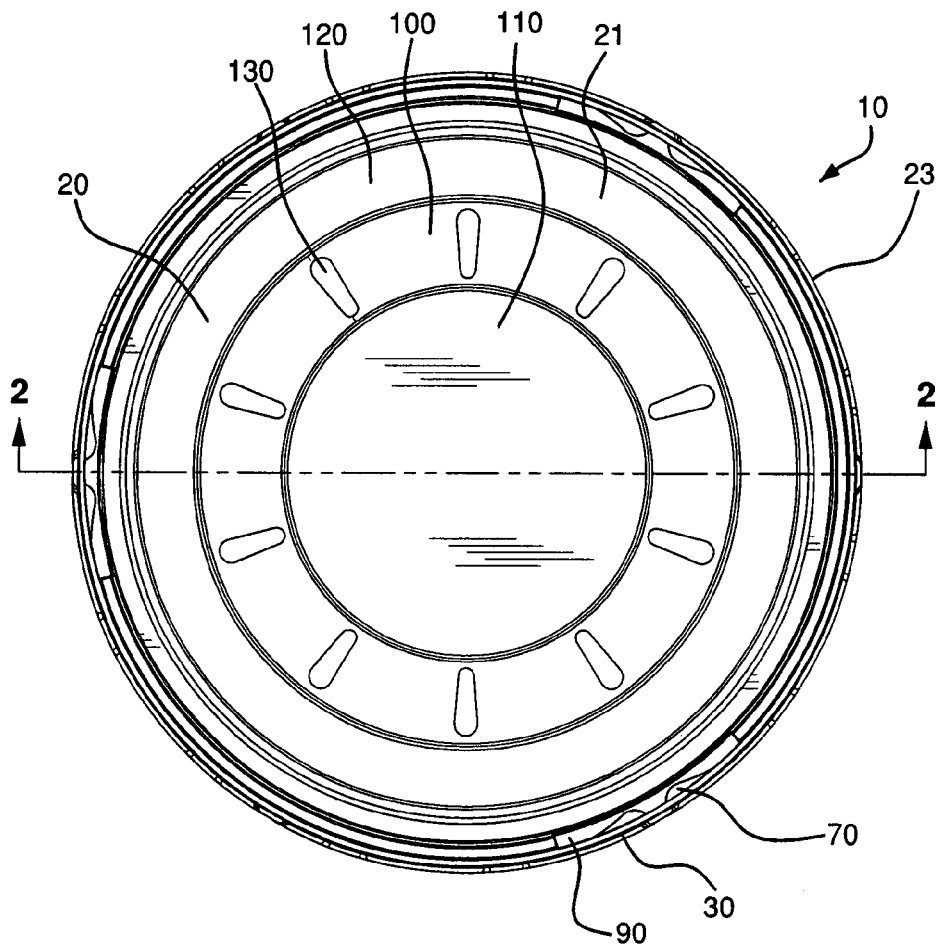
FIG. 1 is a plan view of the top of an embodiment of a container cover according to the present invention.

Referring now to the drawings which illustrate several preferred embodiments of the invention, a container cover is shown for use on a microwavable container. As will be discussed in more detail below, the container cover preferably includes a plurality of integral lock panels.

Figure 6:
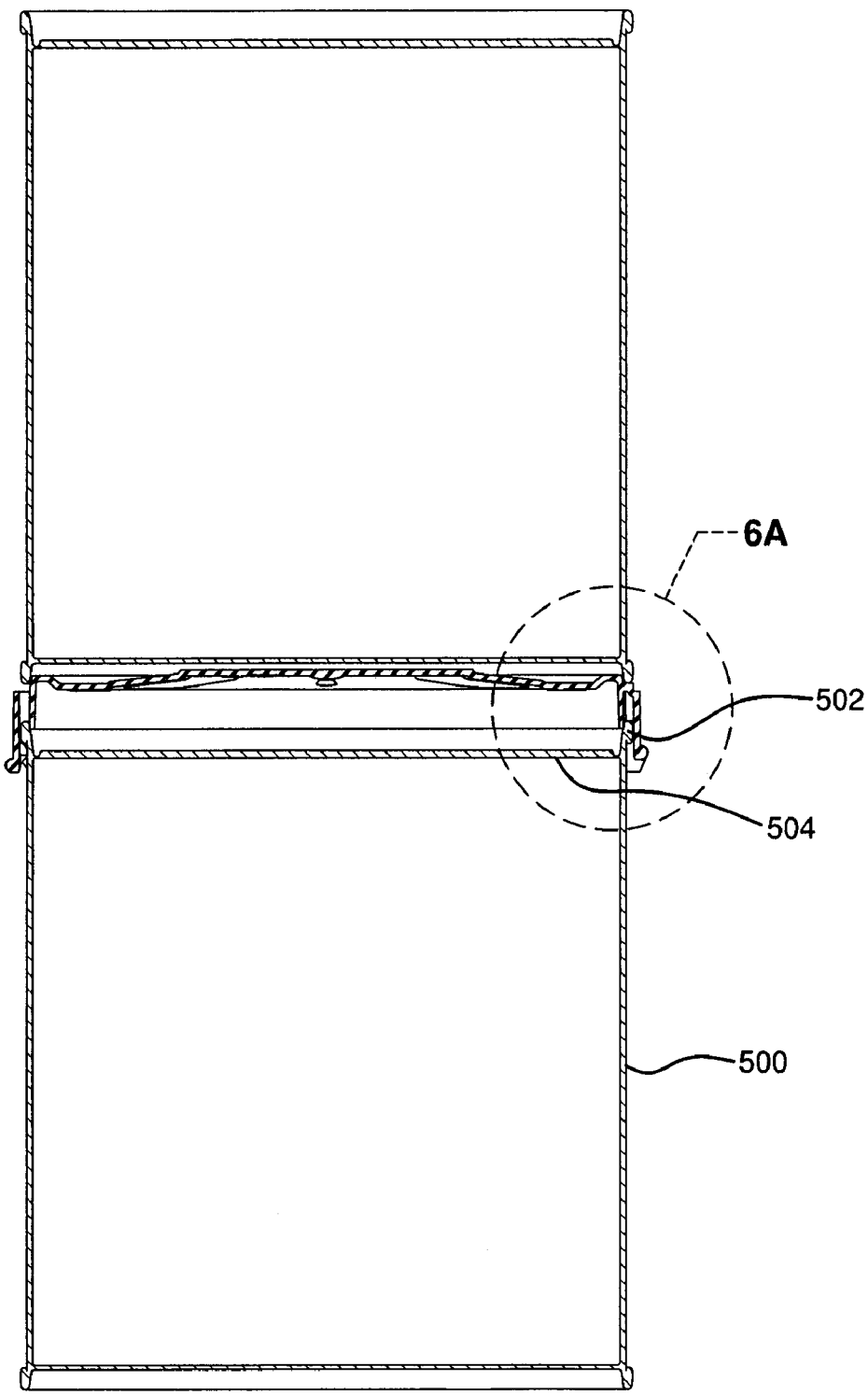
FIG. 6 is a cross-sectional view of the cover of FIG. 1, seen along lines 2-2, and installed on a container, with a second container stacked on top.
Figure 6A:
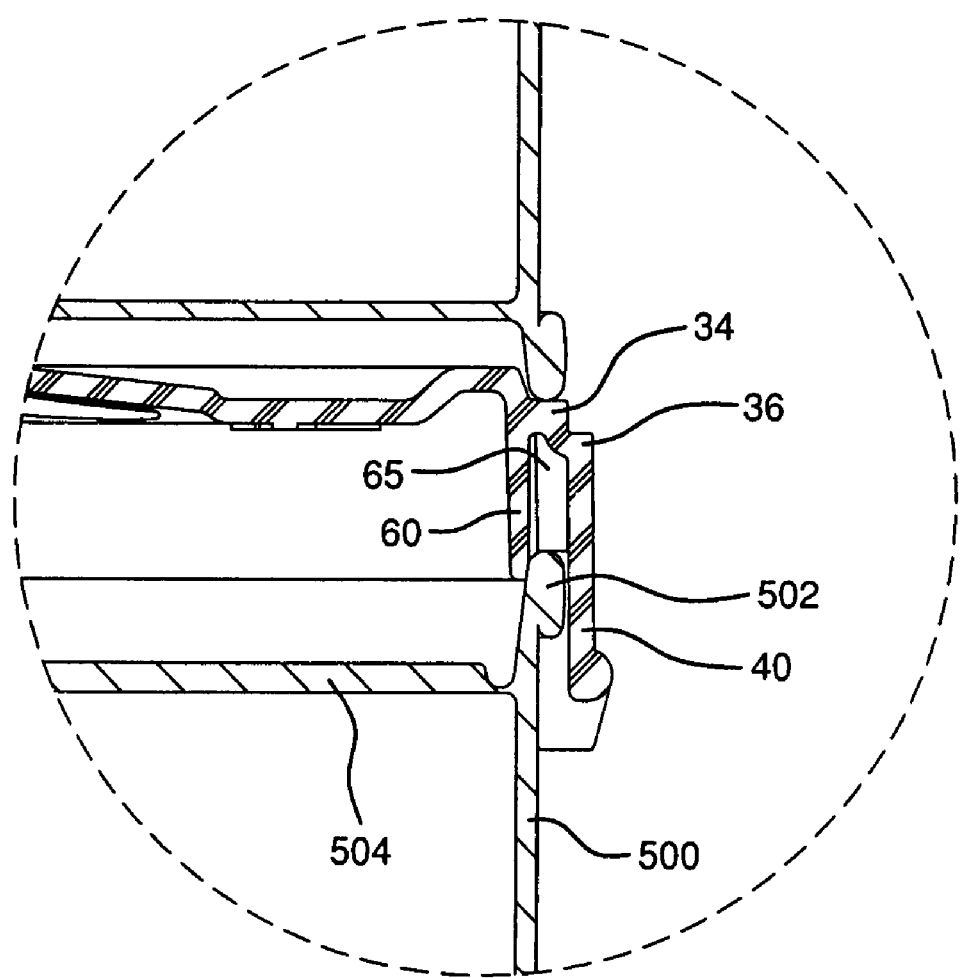
FIG. 6A is an enlarged view of the cover and container stack shown in FIG. 6.

The container may be of any size or shape and may be fabricated from any of a variety of materials. Preferably, the container contains food products which are heated in a microwave oven prior to consumption. Therefore, the container is preferably fabricated from a material suitable for use with food products and for heating in a microwave, for example a thermoplastic material such as polypropylene formed by injection molding. As shown in FIGS. 2A and 6A, the container 500 preferably includes a neck or rim with a protruding lip having an outer bead ring 502, or similar structure proximate to its upper end 504. The outer bead ring may be disposed directly adjacent to the upper end of the container or in close proximity thereto. While the container and the cover 10 are illustrated as each having a substantially circular shape, it will be appreciated by those of ordinary skill in the art that the teachings of the invention are applicable to a variety of other shapes. The following description and embodiments of the invention are not intended to describe all cover/container combinations, but are merely illustrative of how the teachings of the present invention may be employed in the context of a preferred container configuration.

The cover 10 is preferably microwavable and easily removed and reapplied to the container by the user. It is contemplated that the cover can be locked onto the top lip of the container during an assembly process at the factory, keeping the top surface of the container clean during shipping and storage. To remove the cover cap, the user can pull up on any one of the lock panels. This mechanical action moves the lock panel away from a container bead ring 502, at least partially disengaging a lock formed on the inside of the lock panel from the bead ring 502, thereby making it possible to lift a section of the cover 10. As the user lifts up on one lock panel of the cover 10, the cover bends in arc. The connection through the skirt and lid of the adjacent lock panels to the disengaged lock panel causes the adjacent lock panels to also flex away from full engagement with the bead, thereby at least partially disengaging those lock panels from the container bead 502. Thus, the lifting of one lock panel results in at least partial disengagement of the cover 10 from the container 500, thereby allowing the user to completely disengage the cover 10 with relative ease.

In an exemplary implementation, after the user has removed the cover 10, the user opens the container, such as by pulling upward on a now exposed metal ring tab of a sealed container top, completely separating the top from the container and discarding it. Next, the user replaces the cover and places the container and cover combination into a microwave oven. Vent holes may be included in the cover and serve to vent steam generated in the container by the heating process.

Figure 2:
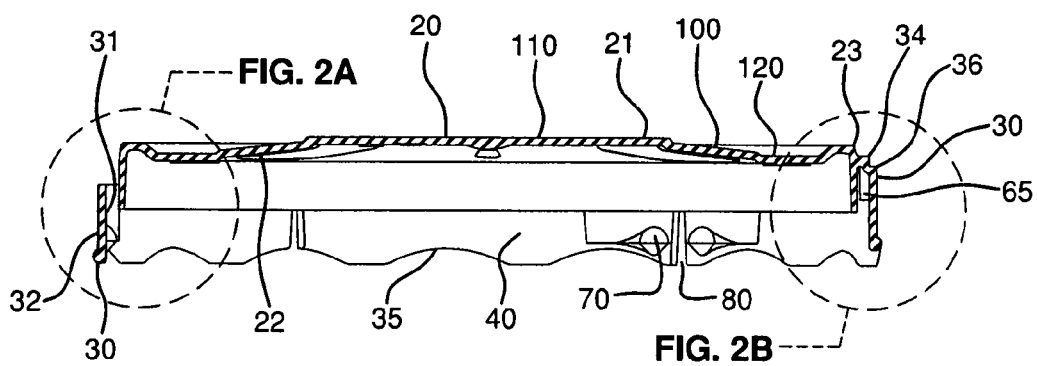
FIG. 2 is a cross-section of the cover of FIG. 1 shown along lines 2-2.
Figure 2A:
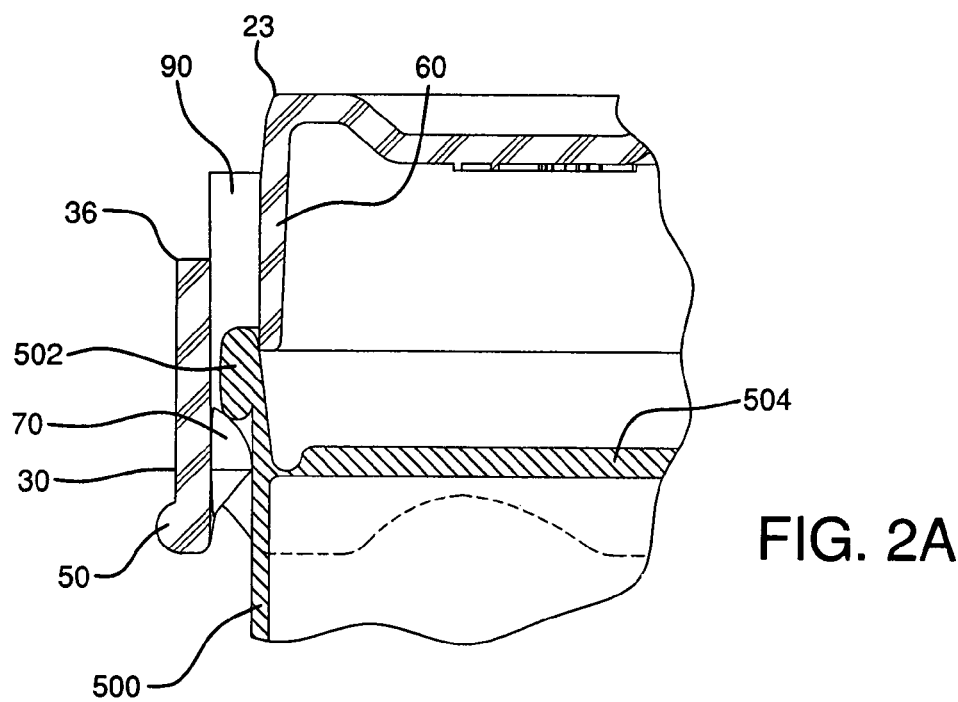
FIG. 2A is an enlarged view of a portion of the cover shown in FIG. 2.
Figure 3:
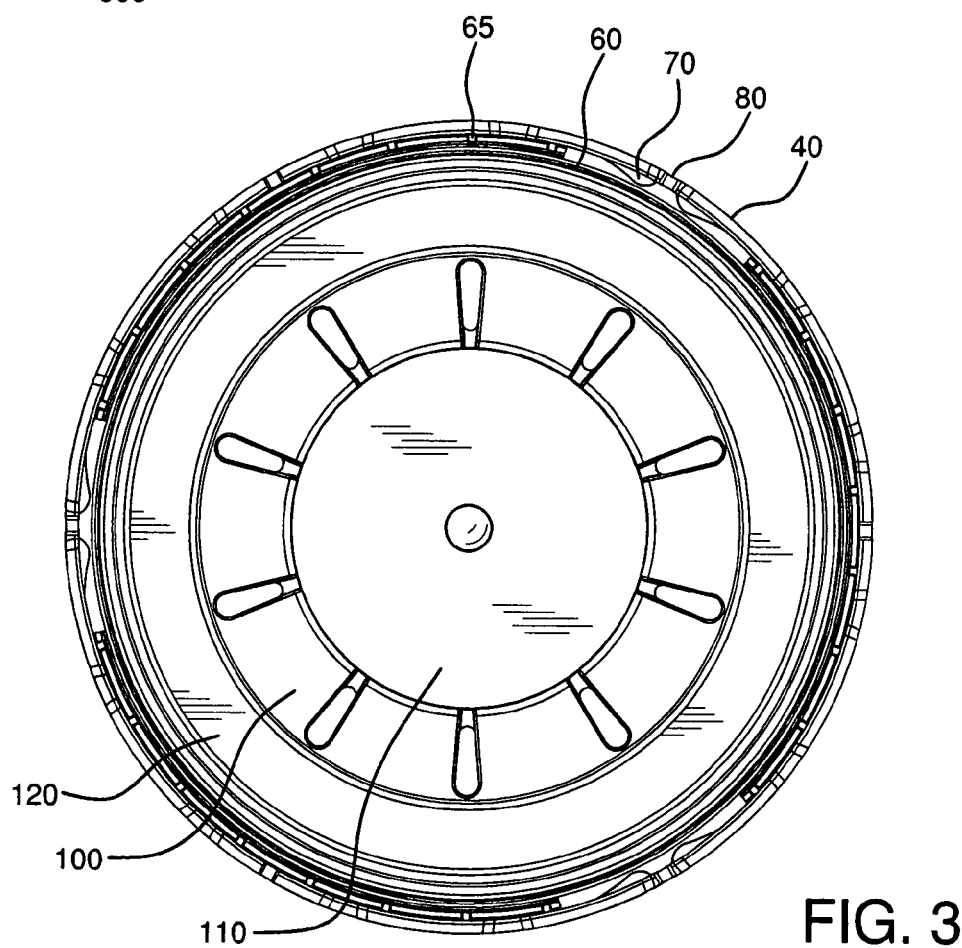
FIG. 3 is a plan view of the bottom of the container cover of FIG. 1.
Figure 2B:
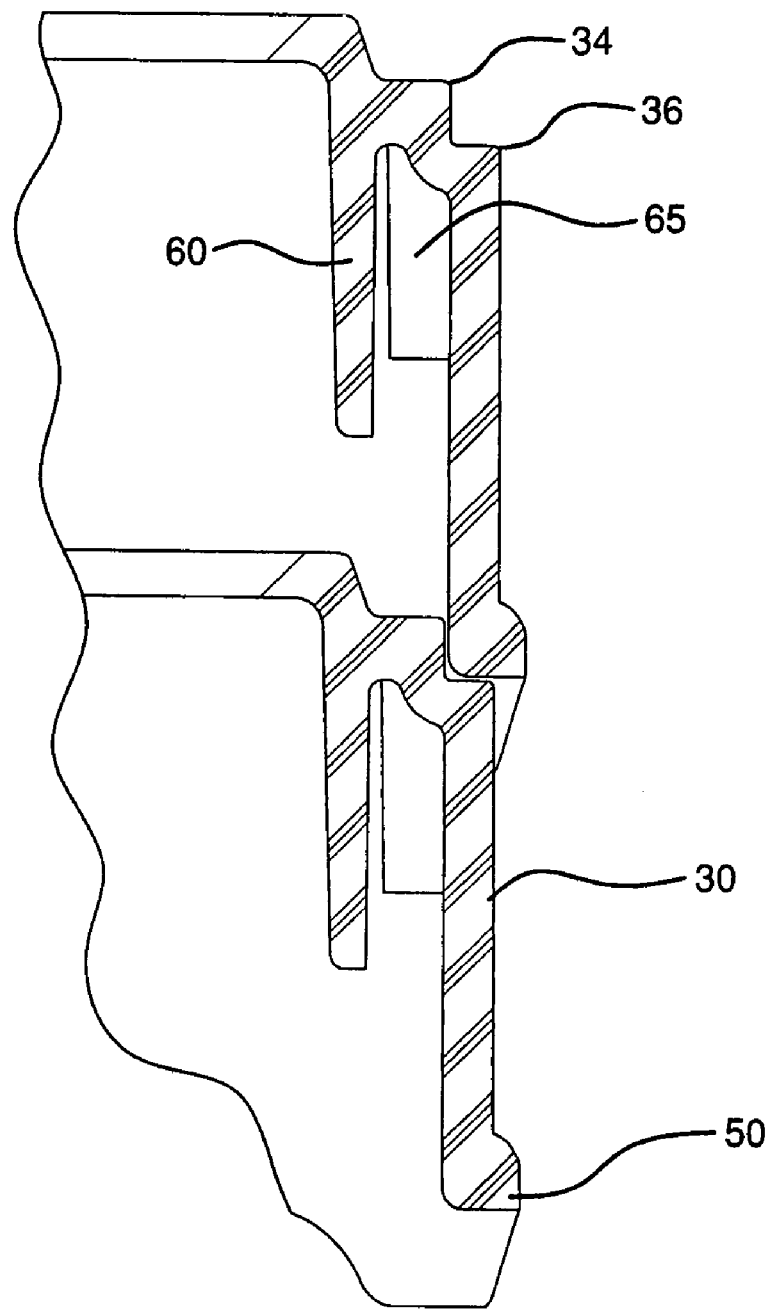
FIG. 2B is an enlarged view of the portion of the cover shown in FIG. 2 with a second cover stacked on top.

Referring to FIGS. 1, 2, and 3, the container cover 10 includes a lid 20, having a top surface 21, a bottom surface 22, and a circumferential edge 23. When installed on the container, the top of the lid faces away from the container, and the bottom of the lid faces into the container. The cover also includes a skirt 30 extending downward from or near the circumferential edge of the lid. The skirt has an inner surface 31 and an outer surface 32. When installed on the container, the outer surface faces away from the container, and the inner surface faces toward the container and is preferably shaped to fit around the outside of the container neck and/or outer bead ring. In a preferred embodiment, the skirt extends downward from the circumferential edge, preferably forming at least one stepped shoulder 34. Each shoulder is defined by a substantially horizontal section extending radially outward from a substantially vertical section of skirt, with the skirt continuing to extend substantially vertically downward from the horizontal section. As shown in FIGS. 2B, 6, and 6A, the cover is designed to be stackable with cans or additional covers, which makes shipping and display more convenient. The skirt 30 preferably includes at least one, and preferably two, shoulders 34 and 36 (shown more clearly in FIGS. 2 and 2B), which have a larger diameter than, and are concentric with, the circumferential edge 23 of the cover. The shoulders may be interrupted by bypass holes 90, located above the locks 70. The shoulders create at least one space on which the base of a container or the skirt of a second cover may rest when stacked, as seen in FIGS. 2B, 6, and 6A. The shoulders also help to stiffen the connection between the skirt and the lid.

Figure 5A:
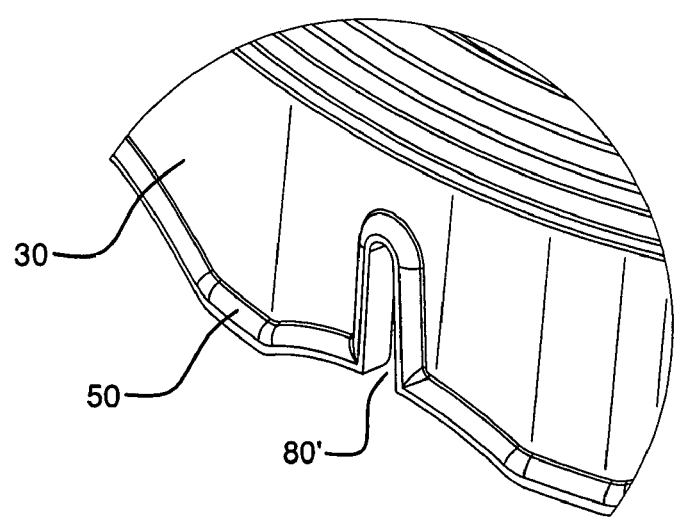
FIG. 5A is an enlarged view of a portion of the cover of FIG. 5.

Preferably, a reinforcement bead 50 is molded around at least a portion of the bottom edge of the skirt and project radially outward from the skirt. The reinforcement bead 50 is visible in FIGS. 2B, 5, and 5A. This bead provides strength around the edge of the cover, stiffens the skirt, and prevents the cover from breaking when flexed during removal from the container. It also helps the cover maintain its shape when heated, as well as aiding the stacking of lids for transport or storage, as seen in FIG. 2B. Finally, the bead aids in removal by providing a greater surface area for a user's fingers to act upon, thus reducing the pressure on the user's fingers.

The skirt 30 also preferably features scallops or recesses 35 on its lower edge. The scallops provide finger grips for the user and visually and tactilely indicate where the lid may be lifted around its circumference. In a preferred embodiment, the scallops are included around the entire circumference of the skirt's bottom edge. The container cover is held onto the container by a plurality of locks 70 and lock panels 40. The locks engage the outer bead ring on the neck of the container, as will be described hereinafter.

Figure 4:
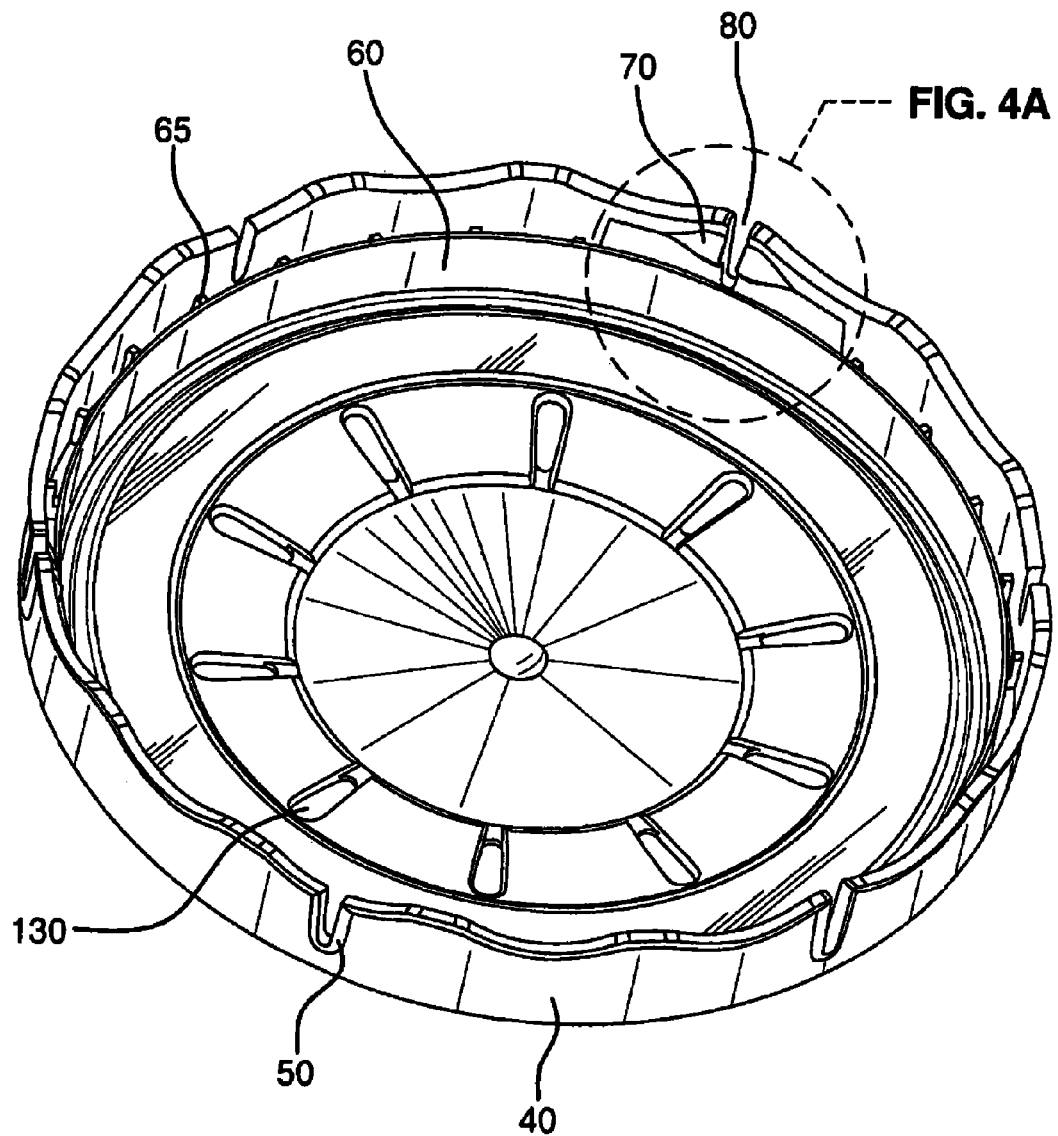
FIG. 4 is an isometric view of the container cover of FIG. 3 illustrating the bottom of the cover.

FIG. 4 is an isometric view of the bottom of the cover of FIG. 1. FIG. 2A is an enlarged partial view of FIG. 2 (a cross-sectional view of FIG. 1, seen along lines 2-2). Referring to FIGS. 2A and 4, a plug seal 60 is preferably formed concentrically to the skirt 30 and has a smaller diameter than the skirt. The plug seal extends from the bottom of the lid and preferably connects along its entire length to the bottom of the lid. As shown in FIG. 2A, the plug seal 60 has an outer surface shaped to preferably fit snugly and sealingly against the inside of the neck or rim of the container. Thus, the plug seal forms a seal against the inside surface of the container rim to prevent or inhibit the contents of the container from readily passing between the container cover and the container rim.

As shown in FIGS. 3 and 4, a plurality of stop ribs 65 preferably extend from the inside of the skirt and/or the bottom of the lid. The stop ribs are located so that, when the cover is installed on a container, the stop ribs touch the top of the container neck limiting the downward movement of the cover onto the container. As shown in FIGS. 2B and 4, stop ribs 65 preferably extend from the skirt and/or the lid, and do not interfere with the plug seal when the cover is installed on a container. As shown in FIGS. 6 and 6A, the distance between the bottom of a stop rib 65 and the top of a lock 70 is preferably sized so that when the cover is installed on a container having a bead ring 502 on its neck, the bottom of the stop rib touches the top of the neck or the bead ring, and each lock engages the bottom of the container bead ring, thereby locking the container cover in place. The stop ribs preferably do not touch the plug seal or cause seal distortions. This leaves the plug seal completely free from all connecting obstructions that create unwanted shrinkage, which can lead to leakage problems. Because the plug seal is uninterrupted, it is preferably completely round and provides a 360 degree seal against the inside of the neck of the container.

Figure 4A:
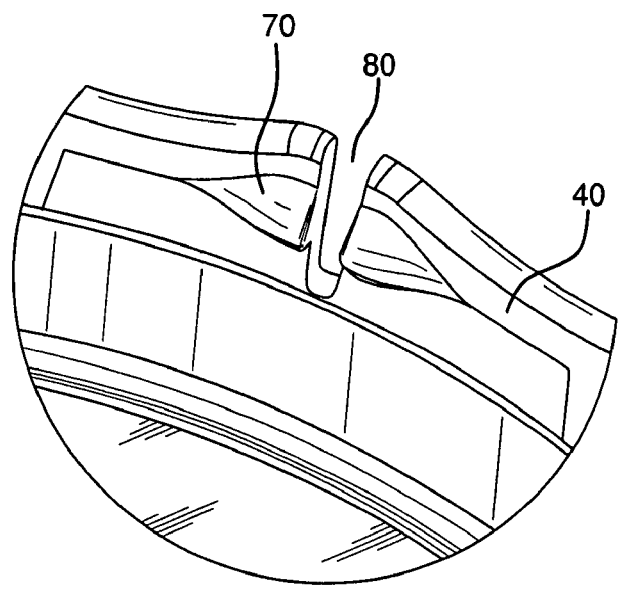
FIG. 4A is an enlarged view of a portion of the cover of FIG. 4.

FIGS. 2A and 4A illustrate the lock panel 40 in more detail. The lock panel 40 is preferably formed as part of the skirt 30. The lock panel includes at least one and optionally two locks 70 that extend radially inward from an inside surface of the lock panel 40. While only one lock is shown on each panel in FIG. 4, it is contemplated that each panel may include a lock on each end of the panel. In a locked position, each lock preferably engages the lower edge of the outer bead ring of the container (especially upon lifting of the cover upwards.) In an unlocked position, each lock is at least partially released from the outer bead ring.

FIG. 4A is an enlarged view of a portion of FIG. 4 showing a lock panel 40. Also shown is one of multiple slots 80, each of which are formed in the skirt 30 on either side of a lock panel, thus defining the ends of each lock panel. The slots extend at least partially up the skirt. Preferably the slots extend at least halfway up the skirt between the bottom and top of the skirt. More preferably, the slots extend for more than 50% of the skirt height. In a preferred embodiment, the slots are about 0.06 inch wide and extend about 0.075 inch over the top of the locks, although other slot sizes and placements can also be used.

Figure 5:
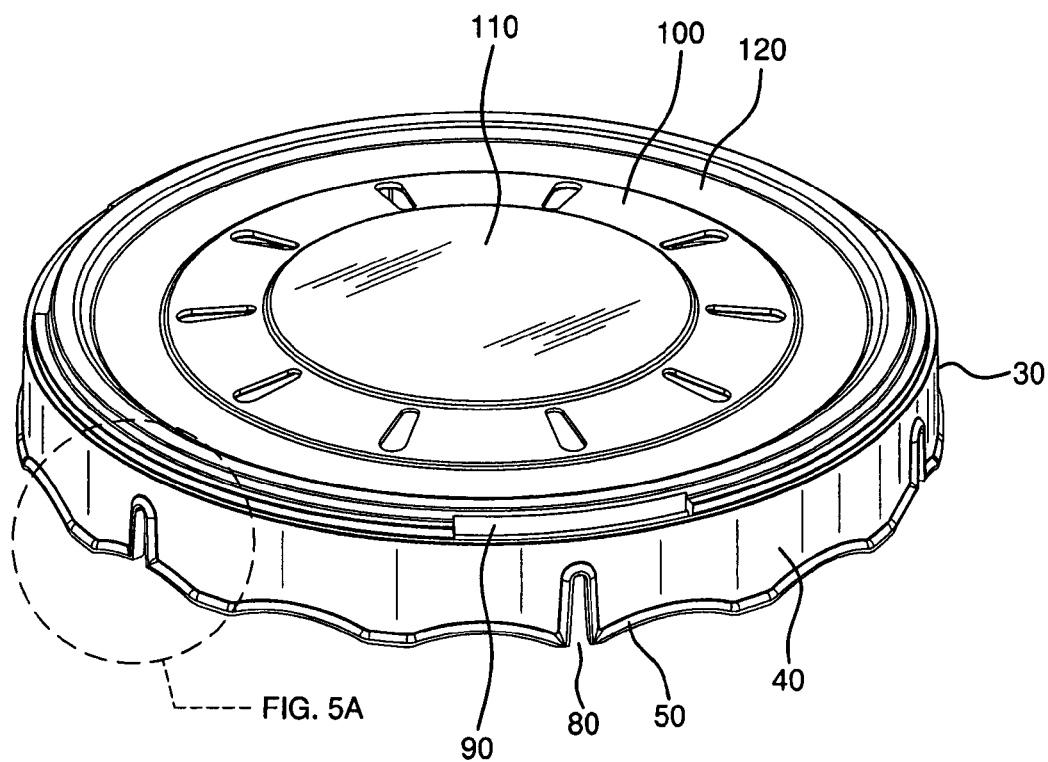
FIG. 5 is an isometric view of the top of the cover shown in FIG. 1.

Also, in a preferred embodiment (and as seen in FIG. 5), the scallops formed in the lower edge of the skirt result in some slots being slightly longer than others. Specifically, the slots alternate between being formed at the point where the scallop meets the bottom edge (the vertically lowermost point on the skirt and, thus, the longer slots) (80 in FIG. 5), and at the base of a scallop (the vertically upward from the edge of the skirt and, thus, the short slots) (80' in FIG. 5A). Preferably the locks are formed adjacent to the longer slots.

The slots permit the flexing of the lock panels 46, thereby permitting the locks to disengage from the container bead.

The flexible nature provided to the lock panels by the slots makes the cover self-adjusting, and compensates for production variances in either the cover or the container. In a preferred container/cover configuration, the container has a circular neck, and the cover has six slots equally spaced about the skirt. The six slots form six approximately equally-sized lock panels about the skirt. There is preferably one lock formed on the inner surface of each lock panel adjacent to a slot and, thus, the locks are preferably on opposite sides of a slot. Thus in a preferred embodiment, three slots each have a pair of locks and three slots do not.

As discussed above, the locks 70 preferably extend radially inward from the inner surface of the skirt 30. A preferred form of the lock can be seen in FIGS. 2A and 4A, with a curved surface portion facing towards the top of the cover (i.e., upward), and a linearly sloping surface portion facing downward. When viewed from below, as in FIG. 3, the locks can be seen to preferably feature a teardrop shape, although other shapes, such as semicircles, are contemplated. This shape creates a tapered leading edge that aids in removal of the lid from the container by providing an easier transition as the lid is flexing. While the preferred embodiment includes a lock that features the illustrated cross-sectional shape, it is contemplated that other cross-sectional shapes, such as triangles, flat-topped wedges, or circular shapes, may be used.

Providing the slots through the skirt adds flexibility to the skirt and the lock panels. Defining a lock panel by the slots allows the panel to flex outward away from the container rim as the locks pass over the container bead ring when the cover is applied or removed. When removing the cover, the slots in the skirt enable the lid to flex when the lock is lifted, promoting easy removal of the cover. The stiffness of each lock panel may be adjusted by varying the length of the slots defining the edge of the panel. It is contemplated that the slots adjacent to the locks may extend through the top of the skirt; however, it is preferable that the slots do not extend to the top of the skirt as the locks will lose some of their effectiveness, particularly during and after microwaving.

The cover preferably has multiple open vent holes to automatically vent excess steam and heat that could build up during the microwaving process. If the steam is not vented, the steam would build up within the container and could potentially cause an injury to the user when removing the lid. In FIGS. 1, 3, 4, and 5, it can be seen that lid 20 includes sloping transitional surface 100, which circumscribes a central upper surface 110. A lower annular surface 120 circumscribes the transitional surface 100. Vents or vent holes 130 are preferably formed in the container cover to allow air and steam to escape from the container when the container's contents are heated. In the illustrated embodiment, the vents are formed on the sloping transition section between the lower annular surface and the upper surface. This configuration is designed to create a chimney effect whereupon the heat generated during cooking is channeled toward the center of the cover and escapes through the vents. This keeps the locks and plug seal cooler, and results in less potential for harm to the user while maintaining a better seal. However, while this embodiment is preferred, other numbers or arrangements of vent holes may serve the same purpose. It should be apparent to one of ordinary skill in the art that while the embodiment features a preferable number and arrangement of vent holes, any number or arrangement of holes may serve substantially the same purpose.

The user may remove the cover by placing his finger tips under one of the lock panels and lifting upwards. The lifting action disengages the locks that are molded on the inside surface of the lock panel. The slots through the skirt assist in removal of the cover by allowing the entire lock panel to flex while being pulled out and away from the container rim. When one lock panel is pulled upward, the adjacent panels begin to flex, causing the locks on those panels to disengage from the container rim. Above each lock is preferably a bypass slot 90 that runs through the top and bottom surfaces of the lid. In one preferred embodiment, the bypass slot is formed during the molding process by dies that pierce downward through the lid. In one preferred embodiment, the die forces a portion of the lid material downward while in its moldable state to form the lock. The illustrated embodiment in FIG. 5 shows a portion of the skirt above the lock as being "shaved," which is the result of the die forming the lock. Although the illustrated embodiment includes the bypass slots 90, it should be readily apparent that the openings are not necessary in the cover. As shown in FIG. 5, this bypass slot follows the arc of the lid's circumferential edge and allows the lock panel to flex more easily.

In a preferred embodiment, the locks are grouped in pairs, with three lock pairs spaced approximately every 120 degrees around the circumference of the lid. This even spacing ensures uniform locking pressure and minimizes distortion of the lid during heating. The inclusion of multiple, evenly-spaced locks also allows removal of the lid by lifting the lid from any point around its circumference. Preferably, the ability to remove the lid by lifting at any point is indicated to a user by the inclusion of scallops forming finger recesses around the entire circumference of the skirt.

Locating the locks on the skirt allows for simple assembly by placing the cover over the container and pressing the cover directly down onto the container. When the lock panels engage, they preferably make a distinct snap sound as the locks slide over the container bead. The locking action can also be felt by the user through the finger tips as the locks lock over the container bead.

As previously described, the container cover is preferably made from one piece of injection-molded polypropylene. Polypropylene has a tendency to grow slightly when heated in a microwave oven; such growth creates dimensional changes and deviations. Because the plug seal is in closest proximity to the heating container contents, it tends to experience more thermal growth than the rest of the cover components. The plug seal expansion improves the seal between it and the container rim, thus serving to reduce the possibility of leakage when the contents are extremely hot. Because the locks are also in direct contact with the container, positioning the locks adjacent to only some of the slots—thus spacing the locks farther apart—creates less vertical distortion of the cover components during heating.

It will be apparent to those skilled in the art that various modifications and variations can be made in the configuration of the present invention without departing from the spirit or scope of the invention. It is intended that the present invention cover such modifications and variations provided they come within the scope of the appended claims or their equivalents.

What is claimed is:

1. A removable locking container cover for covering a container having a neck with an outer bead, the cover comprising:
   a lid having a top surface, a bottom surface, and a circumferential edge;
   a skirt extending downward from the lid at or near the circumferential edge, the skirt having a bottom edge, an outer surface, and an inner surface shaped to extend around the outside of the container neck;
   a plug seal extending from the bottom surface of the lid and concentric with the skirt, the plug seal having a smaller diameter than the skirt, the plug seal having an inner surface and an outer surface shaped to be substantially in contact with the inside of the neck of the container; and a plurality of slots formed in the skirt and extending substantially vertically from the bottom edge of the skirt, the slots being spaced apart from one another around the skirt, each pair of adjacent slots defining a lock panel such that a plurality of lock panels are formed on the skirt, each lock panel having at least one lock formed on an inside surface thereof and projecting inwardly therefrom, the lock being adapted to engage a bottom edge of the outer bead of the container when the cover is locked onto the container so as to removably hold the cover in place on the container;

wherein the at least one lock on each lock panel is located adjacent to one of the slots defining the lock panel, such that the lock is closer to the one of the slots than to the other of the slots; and wherein two locks are located adjacent to and on opposite sides of half of the slots, and no locks are located adjacent to the other half of the slots.

2. The container of claim 1 wherein the slots are substantially equally spaced around the circumference of the skirt so as to form substantially equally sized lock panels.

3. The container cover of claim 1, wherein the lid further includes at least one hole extending through the lid so as to allow air to pass through the at least one hole.

4. The container cover of claim 3, wherein the lid comprises a sloping transition section between a lower annular surface and a central upper surface, and wherein the at least one hole is a plurality of holes formed in the sloping transition surface.

5. The container cover of claim 1, wherein the bottom edge of the skirt includes a molded bead projecting radially outward from the skirt on each locking panel so as to provide an area of increased thickness.

6. The container cover of claim 5, wherein the bead is continuous around the entire skirt and extends around the periphery of each slot.

7. The container cover of claim 1, wherein the lid further comprises a plurality of holes passing through the top and bottom surfaces of the lid, each hole located approximately above a lock.

8. The container cover of claim 1, wherein the skirt includes at least one shoulder extending radially outward from, and concentric with, the circumferential edge of the lid, the skirt extending downward from the shoulder, the shoulder having a diameter larger than the circumferential edge, and configured to provide a resting area for the bottom edge of the skirt of a second cover stacked on the cover.

9. A removable locking container cover for covering a container having a neck with an outer bead, the cover comprising:

a lid having a top surface, a bottom surface, and a circumferential edge;

a skirt extending downward from the lid at or near the circumferential edge, the skirt having a bottom edge, an outer surface, and an inner surface shaped to extend around the outside of the container neck;

a plug seal extending from the bottom surface of the lid and concentric with the skirt, the plug seal having a smaller diameter than the skirt, the plug seal having an inner surface and an outer surface shaped to be substantially in contact with the inside of the neck of the container; and a plurality of slots formed in the skirt and extending substantially vertically from the bottom edge of the skirt, the slots being spaced apart from one another around the skirt, each pair of adjacent slots defining a lock panel such that a plurality of lock panels are formed on the skirt, each lock panel having at least one lock formed on an inside surface thereof and projecting inwardly therefrom, the lock being adapted to engage a bottom edge of the outer bead of the container when the cover is locked onto the container so as to removably hold the cover in place on the container;

wherein the at least one lock on each lock panel is located adjacent to one of the slots defining the lock panel, such that the lock is closer to the one of the slots than to the other of the slots; and wherein at least a portion of the bottom edge of each lock panel includes a scalloped contour so as to define finger recesses; and wherein the slots are alternately formed in the skirt at points corresponding to lowermost points and uppermost points on the bottom edge of the skirt resulting from the scalloped contour, such that in each pair of adjacent slots, one slot is longer than the other.

10. A removable locking container cover for covering a container having a neck with an outer bead, the cover comprising:

a lid having a top surface, a bottom surface, and a circumferential edge;

a skirt extending downward from the lid at or near the circumferential edge, the skirt having a bottom edge, an outer surface, and an inner surface shaped to extend around the outside of the container neck;

a plug seal extending from the bottom surface of the lid and concentric with the skirt, the plug seal having a smaller diameter than the skirt, the plug seal having an inner surface and an outer surface shaped to be substantially in contact with the inside of the neck of the container;

a plurality of slots formed in the skirt and extending substantially vertically from the bottom edge of the skirt, the slots being spaced apart from one another around the skirt, each pair of adjacent slots defining a lock panel such that a plurality of lock panels are formed on the skirt, each lock panel having at least one lock formed on an inside surface thereof and projecting inwardly therefrom, the lock being adapted to engage a bottom edge of the outer bead of the container when the cover is locked onto the container so as to removably hold the cover in place on the container; and a plurality of stop ribs connected to the inside of the skirt and to the bottom of the lid, the stop ribs being spaced apart from the plug seal, the stop ribs being disposed so that when all of the locks engage the container outer bead, substantially all of the stop ribs touch the top of the container neck so as to limit vertical movement of the cover on the container;

wherein the at least one lock on each lock panel is located adjacent to one of the slots defining the lock panel, such that the lock is closer to the one of the slots than to the other of the slots.

11. A removable locking container cover for covering a container having a neck with an outer bead, the cover comprising:

a lid having a top surface, a bottom surface, a circumferential edge, and a center section, the center section including a lower annular section, a sloping transition section, an upper section, and a plurality of holes formed in the center section extending through the top and bottom surfaces so as to allow air to pass through the lid;

a skirt extending downward from the lid at or near the circumferential edge, the skirt having a bottom edge, an outer surface, and an inner surface shaped to extend around the outside of the container neck;

a plug seal extending from and formed integral with the bottom surface of the lid and concentric with the skirt, the plug seal having a smaller diameter than the skirt, the plug seal having an inner surface and an outer surface adapted to substantially contact the inside of the neck of the container;

wherein the skirt is formed of six integral lock panels, each lock panel having at least one inwardly projecting lock formed on the inner surface of the skirt and configured to engage a bottom edge of the outer bead of the container when the cover is locked onto the container so as to removably hold the cover in place on the container, each lock panel having two sides, each side being defined by a slot formed though the skirt and extending substantially vertically from the bottom edge of the skirt;

wherein the locks on adjacent lock panels are grouped in pairs, each pair of locks being located immediately adjacent to and on opposite sides of three of the slots, and spaced apart from and on opposite sides of the other three of the slots.

12. The cover of claim 11, wherein at least a portion of the bottom edge of the skirt includes a scalloped contour so as to define finger recesses.

13. The cover of claim 11, wherein the bottom edge of the skirt includes a molded bead projecting radially outward from the skirt on each locking panel so as to provide an area of increased thickness for grasping by a user's fingertips.

14. The container cover of claim 13, wherein the bead is continuous around the entire skirt and extends around the periphery of each slot.

15. The container cover of claim 11, further comprising a plurality of stop ribs connected to the inside of the skirt and to the bottom of the lid, the stop ribs being spaced apart from the plug seal, the stop ribs disposed so that when the locks engage the outer bead the stop ribs substantially touch the top of the container neck, thereby limiting vertical movement of the cover on the container.

16. The container cover of claim 11, wherein the skirt further includes a shoulder projecting radially outward from, and substantially concentric with, the circumferential edge of the lid, the shoulder having a diameter that is larger than the diameter of the circumferential edge, and which is configured to be concentric with the bottom edge of the skirt of a second cover when stacked on the cover.

17. The container cover of claim 16, wherein the lid further includes three bypass holes passing through the top and bottom surfaces of the lid, the bypass holes located on substantially the same diameter as the shoulder, each hole located approximately above a lock.

18. A removable locking container cover for covering a container having a neck with an outer bead, the cover comprising:

a lid having a top surface, a bottom surface, and a circumferential edge;

a skirt extending downward from the lid at or near the circumferential edge, the skirt having a bottom edge, an outer surface, and an inner surface shaped to extend around the outside of the container neck;

a plug seal extending from the bottom surface of the lid and concentric with the skirt, the plug seal having a smaller diameter than the skirt, the plug seal having an inner surface and an outer surface shaped to be substantially in contact with the inside of the neck of the container; and a plurality of slots formed in the skirt and extending substantially vertically from the bottom edge of the skirt, the slots being spaced apart from one another around the skirt, each pair of adjacent slots defining a lock panel such that a plurality of lock panels are formed on the skirt, each lock panel having at least one lock formed on an inside surface thereof and projecting inwardly therefrom, the lock being adapted to engage a bottom edge of the outer bead of the container when the cover is locked onto the container so as to removably hold the cover in place on the container;

wherein at least a portion of the bottom edge of each lock panel includes a scalloped contour so as to define finger recesses; and wherein the lock on each lock panel is located on a circumferential end of the lock panel immediately adjacent to the slot separating that lock panel from an adjacent lock panel, and wherein for any pair of adjacent lock panels, the lock on one lock panel is positioned on a different circumferential end of the lock panel than the lock on the other lock panel of the pair.

* * * * *